Aug. 26, 1952     P. H. TAYLOR     2,608,129
TWO-MIRROR TELESCOPE FOCUSING SYSTEM
Filed March 26, 1951

INVENTOR:
PHILIP H. TAYLOR

BY Hubert E. Metcalf
HIS PATENT ATTORNEY

Patented Aug. 26, 1952

2,608,129

UNITED STATES PATENT OFFICE 2,608,129

TWO-MIRROR TELESCOPE FOCUSING SYSTEM

Philip H. Taylor, Los Angeles, Calif., assignor to Northrop Aircraft, Inc., Hawthorne, Calif., a corporation of California Application March 26, 1951, Serial No. 217,519

2 Claims. (Cl. 88—57)

This invention relates to a two-mirror telescope with spherical mirror surfaces.

The well-known cassegrain telescopes, while completely corrected on the axis, suffers from two defects. First, the surfaces are a paraboloid and a hyperboloid of revolution, for the concave and convex mirrors, respectively, leading to difficulties of manufacture. Secondly, the extra-axial image quality is poor. Corrections for these defects constitute the objects of this invention.

If the f/ratio of a telescope is great enough, I have found that a simple combination of one concave and one convex spherical reflecting surface will yield substantially perfect axial images. The extra-axial imagery likewise will be substantially perfect at least over a field of 0.7 degree when an effective aperture of four inches and a focal length of eighty-five inches (f/21) is used.

Figure 1:
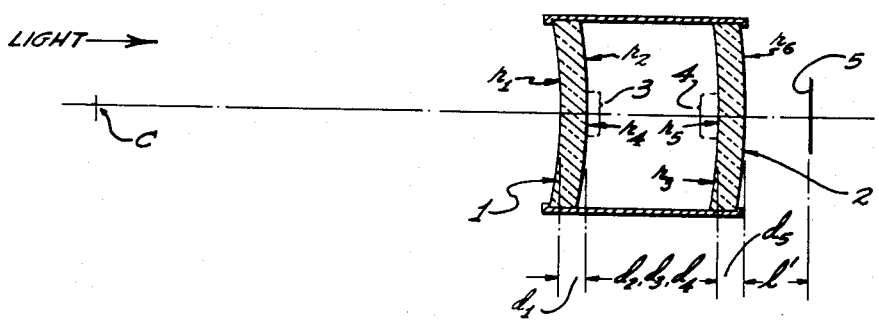
Figure 2:
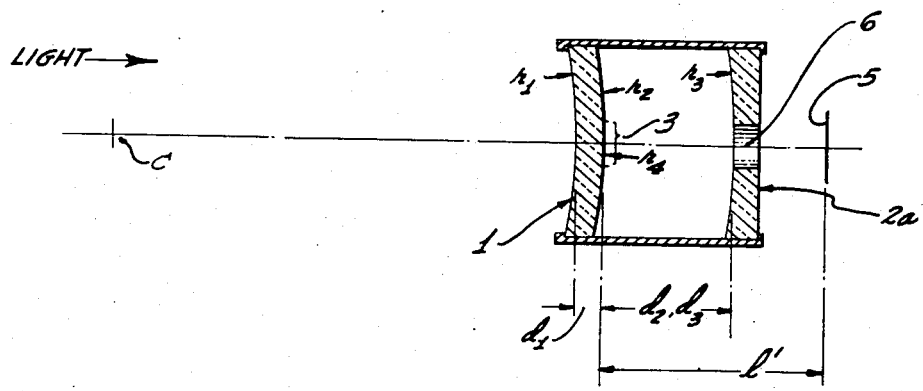

In accompanying drawings forming a material part of this disclosure, Figure 1 and Figure 2 show schematically two forms of an instrument embodying the present invention.

Referring first to Figure 1, a meniscus lens 1 having a spherical front concave surface with a radius $r_1$ and a spherical rear convex surface with a radius $r_2$ is positioned with the concave surface facing a source of light.

Coaxially positioned behind lens 1 is a primary concave mirror 2 having a spherical reflecting surface with a radius $r_3$ facing lens 1 and a rear surface with a radius $r_6$. Lens 1 is provided with a central reflecting spot 3 on the rear surface thereof, this spot having a radius $r_4$.

Primary mirror 2 has a central transparent spot 4, with a radius $r_5$, thus forming at spot 4 a meniscus lens. The axial thickness of lens 1 is designated as $d_1$; the axial distance between the rear surface of lens 1 and the front surface of mirror 2 being designated $d_2$; $d_3$ is the axial distance between mirror 2 and reflecting spot 3; $d_4$ is the distance between reflecting spot 3 and transparent spot 4; $d_5$ is the axial thickness of mirror 2; and $l'$ is the axial distance of the image plane 5 back of the rear surface of mirror 2.

All surface radii are centered at a common center C ahead of lens 1. It will thus be seen that the central reflecting spot 3 acts as a secondary mirror to reflect rays from primary mirror 2 through the transparent spot 4 to the image plane 5. The outer portions of lens 1 act as a meniscus lens for rays reaching primary mirror 2 and the inner portion of mirror 2 acts as a meniscus lens for rays reflected by reflecting spot 3.

In this embodiment both elements 1 and 2 are used as transmitting and reflecting elements, allowing the space between the elements to be sealed, with a desiccant therein, thereby enabling the inner surfaces having radii $r_2$, $r_3$, $r_4$ and $r_5$ to be kept clean and dry at all times.

In the embodiment shown in Figure 2, the rear element 2a is a reflector only, light from the reflecting spot 3 on the front element 1 passing through an axial hole 6 in mirror 2a to the image plane. In this case, hole 6 can be used to support a stop for use in reducing glare.

A preferred ray trace prescription for the system shown in Figure 1 is as follows:

$r_1 = -53.20$  
$d_1 = \phantom{-}1.00$ } Borosilicate crown glass  
$r_2 = -54.20$  
$d_2 = \phantom{-}25.80$  
$r_3 = -80.00$  Spherical mirror surface  
$d_3 = -25.80$  
$r_4 = -54.20$  Spherical mirror surface  
$d_4 = \phantom{-}25.80$  
$r_5 = -80.00$  
$d_5 = \phantom{-}1.00$ } Borosilicate crown glass  
$r_6 = -81.00$  
$l' = \phantom{-}4.25$ Effective aperture = 4 inches  
Focal length = 85 inches (f/21)

where  
$d$ is axial distance in inches;  
$r$ is the radius in inches of a surface;  
$l'$ is the axial distance from the last surface to the image plane.

A ray trace prescription for a preferred form of system as shown in Figure 2 is as follows:

$r_1 = -53.20$  
$d_1 = \phantom{-}1.00$ } Borosilicate crown glass  
$r_2 = -54.20$  
$d_2 = \phantom{-}25.80$  
$r_3 = -80.00$  Spherical mirror (Pyrex or fused quartz)  
$d_3 = -25.80$  
$r_4 = -54.20$  Spherical mirror  
$l' = \phantom{-}30.67$ Focal length = 85 inches Where $d$ is axial distance in inches;  
$r$ is the radius of a surface;  
$l'$ is the axial distance from the last surface to the image plane.

In both embodiments all defects are suppressed below the limit where they can have any effect on the image over a field of at least 0.7 degree.

What is claimed is:

1. A telescope consisting of a meniscus lens concave toward a light source and a concave mirror surface spaced behind said lens and facing said lens, the front and back surfaces of said lens and said mirror surface being spherical and having a common center of curvature ahead of said lens, the back surface of said lens having an axial reflecting spot, said mirror surface having an axial light transmitting spot whereby light from said source passes through said lens outside of said reflecting spot is reflected by said mirror surface to said reflecting spot and is reflected thereby through said light transmitting spot to an image plane behind said mirror surface, said telescope having the following prescription:

$r_1 = -53.20$
$d_1 = 1.00$ Borosilicate crown glass
$r_2 = -54.20$
$d_2 = 25.80$
$r_3 = -80.00$ Spherical mirror (Pyrex or fused quartz)
$d_3 = -25.80$
$r_4 = -54.20$ Spherical mirror
$l' = 30.67$
Focal length = 85 inches where $d$ is axial distance in inches;
$r$ is the radius of a surface;
$l'$ is the axial distance from the last surface to the image plane.

2. A telescope consisting of a first meniscus lens concave toward a light source, a second meniscus lens having a concave front surface and a spherical rear surface, said second lens being coaxially spaced behind said first lens, said front surface of said second lens being a mirror surface, the front and back surfaces of said first lens and the mirror surface of said second lens being spherical and having a common center of curvature ahead of said first lens, the rear surface of said first lens having an axial reflecting spot thereon, and said mirror surface having an axial light transmitting spot therein whereby light from said source passes through said first lens outside of said reflecting spot and is reflected by said mirror surface to said reflecting spot and is reflected thereby through said light transmitting spot to an image plane behind said second lens, said telescope having the following prescription:

$r_1 = -53.20$
$d_1 = 1.00$ Borosilicate crown glass
$r_2 = -54.20$
$d_2 = 25.80$
$r_3 = -80.00$ Spherical mirror surface
$d_3 = -25.80$
$r_4 = -54.20$ Spherical mirror surface
$d_4 = 25.80$
$r_5 = -80.00$
$d_5 = 1.00$ Borosilicate crown glass
$r_6 = -81.00$
$l' = 4.25$ inches
Effective aperture = 4 inches
Focal length = 85 inches (f/21)

where $d$ is axial distance in inches;
$r$ is the radius in inches of a surface;
$l'$ is the axial distance from the last surface to the image plane.

PHILIP H. TAYLOR.

REFERENCES CITED

The following references are of record in the file of this patent:

UNITED STATES PATENTS

| Number | Name | Date |
|---|---|---|
| 2,492,461 | Bouwers | Dec. 27, 1949 |
| 2,520,635 | Grey | Aug. 29, 1950 |

FOREIGN PATENTS

| Number | Country | Date |
|---|---|---|
| 544,694 | Great Britain | Apr. 23, 1942 |
| 586,851 | Great Britain | Apr. 2, 1947 |

OTHER REFERENCES

Maksutov, Article "New Catadioptric Meniscus Systems," pages 270 to 284, Journal Optical Society of America, vol. 34, No. 5, May 1944; published by American Institute of Physics Inc., 57 East 55th Street, New York 22, N. Y. (Copy in Division 7.)